May 14, 1957 W. E. GLASSBURN 2,792,531
RELAYS
Filed Oct. 7, 1955
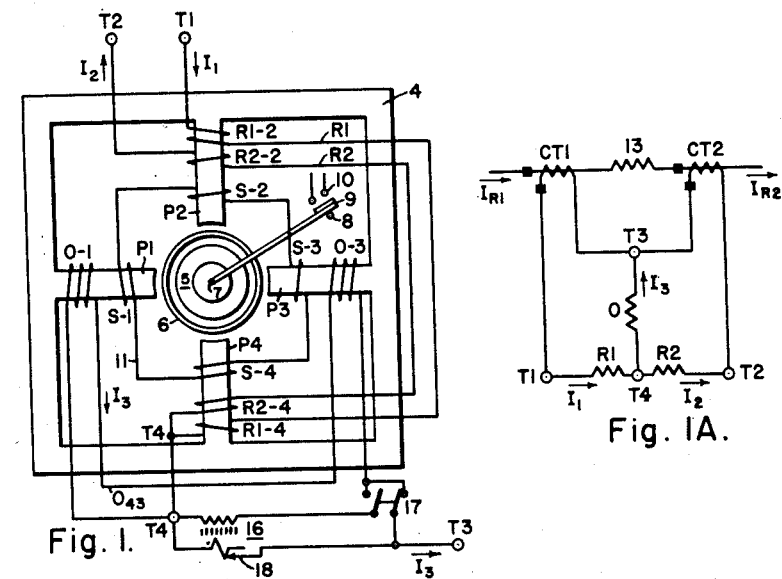
Fig. 1.
Fig. 1A.
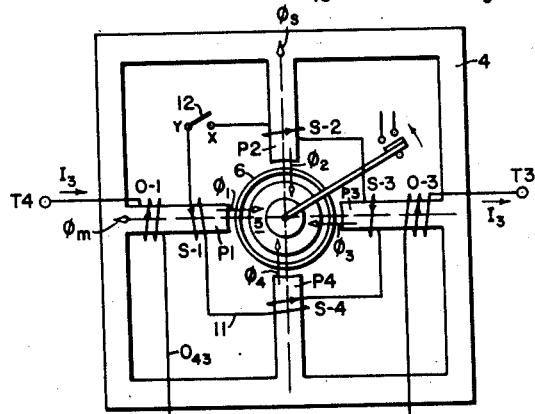
Fig. 2.
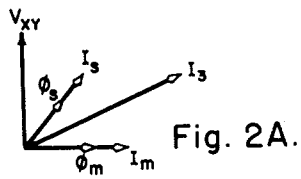
Fig. 2A.
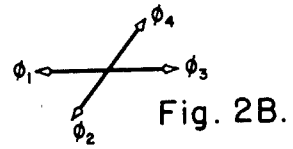
Fig. 2B.
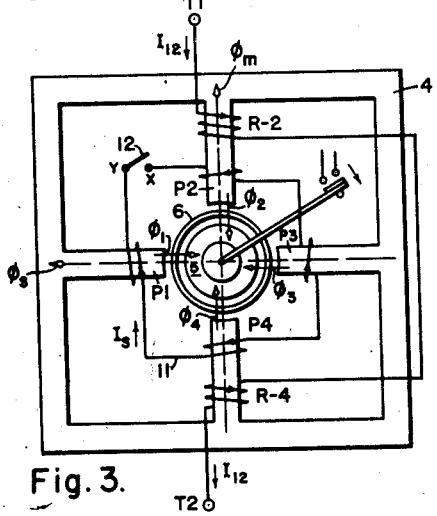
Fig. 3.
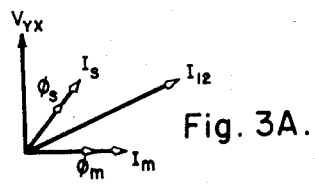
Fig. 3A.
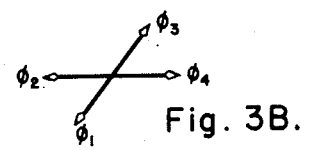
Fig. 3B.

2,792,531
Patented May 14, 1957

United States Patent Office 2,792,531

RELAYS

William E. Glassburn, Bloomfield, N. J., assignor to Westinghouse Electric Corporation, East Pittsburgh, Pa., a corporation of Pennsylvania Application October 7, 1955, Serial No. 539,122

4 Claims. (Cl. 317—58)

My invention relates to a new type of differential relay, and component parts thereof. Essentially, it relates to a four-pole relay having an induction-cup rotor, or any equivalent construction, characterized by having a secondary winding on each of the poles, and a closed secondary circuit including all of said secondary windings. The four poles of the stationary field-member are energized from two different energizing-currents, each current exciting two diametrically opposite field-poles, making one pole north while the other is south. The result of the secondary winding-construction is that the secondary circuit responds separately to each of the two exciting circuits, producing dephased secondary fluxes in the pair of diametrically opposite poles which are in quadrature relation to the pole-pair on which the exciting windings are mounted, and the phase-displacements are such that one of the exciting circuits thus produces an operating torque, while the other exciting circuit produces a restraining torque, giving a differential relay response.

An exemplary form of embodiment of my invention is shown in the accompanying drawing, wherein:

Figure 1 is a simplified diagrammatic and structural view of a percentage differential relay-element embodying my invention;

Fig. 1A is a diagrammatic view of a percentage differential circuit-connection for the relay of Fig. 1;

Fig. 2 is a structural view, similar to Fig. 1, illustrative of the operation of the relay with the restraint-torque energizing-windings omitted;

Figs. 2A and 2B are vector diagrams corresponding to Fig. 2, showing the phase-rotation or the direction of the torque developed by the energization of the operating windings alone;

Fig. 3 is a structural view, similar to Fig. 1, illustrative of the operation of the relay with the operating-torque energizing-windings omitted; and Figs. 3A and 3B are vector diagrams, similar to Figs. 2A and 2B, illustrative of the relay-operation when only the restraint-torque energizing-windings are excited.

There are three essential elements of the illustrative induction-type relay-element which is shown in Fig. 1, namely, a (preferably) outer stationary multipole magnetic-field member 4, a (preferably) central stationary magnetic return-path member 5, and a (preferably) light-weight rotor-member which comprises an induced-current element of conducting material 6 which is disposed between the central magnetic member 5 and the outer field-frame 4. The field-member 4 is illustrated as being provided with four inwardly directed salient pole-pieces P1 to P4. The two diametrically opposite poles P1 and P3 are illustrated as being excited by two correspondingly numbered primary operating-windings O–1 and O–3, respectively, while the other two diametrically opposite poles P2 and P4 are illustrated as being excited by four dual-circuit primary restraint-windings R1–2, R2–2, R1–4 and R2–4, arranged in two serially connected circuits R1 and R2, in a manner similar to previously known percentage differential relays. The relay of Fig. 1 is illustrated as having two restraint-circuit current-terminals T1 and T2, an operating-circuit current-terminal T3, and an intermediate connection-point or terminal T4.

The foregoing description of elements constitutes a general description of the basic idea of the apparatus toward which my present invention is primarily directed, although it is susceptible of embodiment in other forms. Any means for producing the plurality of magnetic poles may be used, whether the primary energizing-windings O and R are disposed in winding-receiving slots spaced circumferentially about a ring-type stator member, or whether, as illustrated, the field-frame 4 is a salient-pole frame having an outer yoke member and a plurality of inwardly projecting salient-pole pieces such as the poles P1 to P4.

The primary pair of diametrically opposite alternating-current energizing field-windings O–1 and O–3 are connected in a single-phase primary relay-operating energizing-circuit $O_{43}$ which is connected between the terminals T4 and T3, with the primary operating-torque coils O–1 and O–3 in such polarities that one pole of said primary pair is north at the same moment when the diametrically opposite pole of that primary pair is south. In a similar manner, a single-phase primary relay-restraining energizing-circuit is provided for the restraint-windings R1–2 and R2–1 which are disposed on the pole P2, and for the diametrically opposite restraint-windings R1–4 and R2–4 which are disposed on the pole P4, the polarities being such that one pole (such as P2) is north at the same moment when the diametrically opposite pole (such as P4) is south. The relay-restraining energizing-circuit may be traced from the terminal T1 through the coil R1–2 and a first restraint-circuit R1 to the coil R1–4 and the intermediate connecting-point T4, and thence through a second restraint-circuit R2 and the coils R2–2 and R2–4 (in either order) to the terminal T2.

The secondary or induction element 6 of the device may also take any one of a number of different forms, such as the double-loop elements which are shown in the Sonnemann et al. Patent 2,380,197 and the Mehring Patent 2,380,187, or the cylindrical or cup-type rotor-elements of the Bancker Patent 2,110,655, the latter being illustrated in my drawing. The rotor member 6 is mounted on a freely pivoted shaft 7, which may be biased toward a back-stop 8, as is conventionally illustrated by the illustrated non-energized position of the device. The shaft 7 carries a contact-arm 9 for making or closing contacts at 10 when the relay responds, as will be subsequently described.

My present relay, as shown in Fig. 1, is characterized by the addition of four secondary field-windings or field-winding-means S–1 to S–4, which are mounted on the correspondingly numbered pole-pieces P1 to P4, or otherwise spaced about the field-member 4 in a four-pole construction, in such manner that the correspondingly numbered or located primary and secondary windings are in inductive relation to each other, on each of the four poles. The secondary field-windings S–1 to S–4 are connected in a closed secondary circuit 11 which includes all of said secondary windings in such pluralities that one pole of each of the two secondary pairs of diametrically opposite secondary windings is north at the same moment when the diametrically opposite pole of that secondary pair is south.

The operation of the relay-element which is shown in Fig. 1 will best be described by showing that, when the element is energized with an operating current only, the torque produced will be in a given direction, namely, counterclockwise, whereas, when the element is energized with a restraint-current only, the torque produced will be in the opposite direction, namely, clockwise. Since the operating and restraining primary circuits T4—T3 and T1—T2 are current-energized, or traversed by fixed currents, each energizing-current will produce whatever flux or voltage may be necessary to maintain its own current, in spite of the electrical coupling which is provided by the secondary winding P1–P4. Thus, when the element is energized with both an operating current and a restraint-current, it will produce a differential response to these two currents.

Thus, Fig. 2 shows the relay with only the operating-circuit $O_{43}$ energized. It is assumed that this operating-circuit is energized by an operating-current $I_3$, which is the vector sum of a magnetizing current $I_m$ and a secondary current $I_s$ as shown in Fig. 2A. The magnetizing current $I_m$ produces a diametrically flowing flux $\phi_m$ as shown. The secondary current $I_s$ is induced by the magnetic couplings between the coils O–1 and S–1, and between the coils O–3 and S–3, respectively, and this secondary current $I_s$, flowing in the secondary coils S–2 and S–4 on the other pair of diametrically opposite poles, produces a diametrically flowing flux $\phi_s$ in the poles P4 and P2, as shown. In order to show the voltage $V_{XY}$ of the secondary circuit 11, this circuit is shown, for illustrative purposes, as being provided with a switch 12 between the secondary terminals X and Y, although it will be understood that normally this secondary-circuit switch 12 is closed, and in fact, no such switch will be provided, the same being shown merely for the purpose of identifying the secondary terminals X and Y, so as to provide reference-points for the secondary voltage $V_{XY}$.

In Fig. 3, on the other hand, the relay is shown with only the restraint-circuit T1—T2 energized. Here the two primary restraint-windings R1–2 and R2–2 on the pole P2 are replaced by a single equivalent exciting-winding R–2, while the diametrically opposite restraint-windings R1–4 and R2–4 on the pole P4 are replaced by a single equivalent winding R–4. It is assumed that the restraining current $I_{12}$ flows through this restraining circuit from the terminal T1 to the terminal T2, this current being again the vector sum of a magnetizing current $I_m$ and a secondary current $I_s$, as shown in Fig. 3A.

Using the vector polarity convention explained in Silent Sentinels, © 1949, pages 32, 34, 116–117, and assuming that the phase-angle of the secondary circuit 11 is 38° lagging, the phase-positions of the secondary current $I_s$ and the secondary flux $\phi_s$ are determined with respect to the primary and secondary voltage-drop $V_{XY}$ or $V_{YX}$ across the inductance of the primary energizing-windings O–1 and O–3 in Fig. 2, or the primary energizing-windings R–2 and R–4 in Fig. 3, as the case may be. Since the magnetizing current $I_m$ and the magnetizing flux $\phi_m$ lag 90° behind the inductive voltage-drop $V_{XY}$ (Fig. 2A), or the drop $V_{YX}$ (Fig. 3A), the phase-positions of these vectors are also fixed, as shown in Figs. 2A and 3A. The primary-circuit current, such as the operating current $I_3$ in Fig. 2A, or the restraining current $I_{12}$ in Fig. 3A, is in each case the vector-sum of the secondary and magnetizing currents $I_s$ and $I_m$, so that the phase-position of the primary current $I_3$ or $I_{12}$, as the case may be, is fixed, in each of said Figs. 2A and 3A, respectively.

Defining the pole-fluxes $\phi_1$, $\phi_2$, $\phi_3$ and $\phi_4$ as the fluxes which flow into the induction rotor-element 6 in each case, it will be evident that one of the two pole-fluxes of each pair of diametrically opposite poles will be in phase with the magnetizing flux $\phi_m$ or the secondary flux $\phi_s$, as the case may be, while the other pole-flux of each pair has the opposite sign. The directions of field-rotation are evident from the pole-flux vector-diagrams of Figs. 2B and 3B, which show that the operating-current $I_3$ produces a counterclockwise field-rotation of its pole-fluxes $\phi_1$, $\phi_2$, $\phi_3$ and $\phi_4$ (Fig. 2B), whereas the restraint-current $I_{12}$ produces a clockwise rotation of its pole-fluxes $\phi_1$, $\phi_2$, $\phi_3$ and $\phi_4$ (Fig. 3B). The result of the foregoing is that the relay of Fig. 1 produces an operating torque which is responsive to the square of the operating current $I_3$, and a restraining torque which is responsive to the square of the restraining current $(I_1+I_2=I_{12})$.

As in other induction relays having four-pole field-frames with two diametrically flowing fluxes, the torques produced in the relay are steady torques, having no pulsating double-frequency torque-responses, as described and claimed in the Sonnemann et al. Patent 2,380,197, granted July 10, 1945.

When the relay of Fig. 1 is connected in the familiar percentage-differential circuit which is shown in Fig. 1A, it may be used to protect a winding or circuit 13, the circuit of which is provided, on one side, with a current transformer CT1, and on the other side with a current transformer CT2. In the event of either a normal load-current or a "through" or external fault-condition, the entering and leaving currents $I_{R1}$ and $I_{R2}$ of the protected winding or circuit 13 will be equal and in phase, and will add to produce a net restraint-current $(I_2+I_2=2I_{R1})$, while at the same time the operating current $I_3$, in the operating windings O, will be zero. In the event, however, of an internal fault with equal feed from both sides, one or the other of the currents $I_{R1}$ or $I_{R2}$ will reverse, so that the net restraint-current will become zero, while the operating current will be equal to $2I_{R1}$.

The percentage differential relay of Fig. 1 may be made to have a variable percentage characteristic in the manner which is common for previously known percentage differential relays, namely by introducing a saturating transformer 16 in the energizing-circuit for the operating coils O–1 and O–3, which may be diagrammatically indicated by the use of a changeover switch 17, by which the saturating transformer 16 may be cut in or cut out, if it should be desired to provide a relay which can be operated either with or without said saturating transformer. The saturating transformer, if used, will ordinarily be provided with percentage taps 18 in a known manner.

While I have illustrated my invention in a single illustrative form of embodiment, I wish it to be understood that alternative or equivalent forms of the various essential elements could be substituted. Thus, the rotor 6 and the central stationary magnetic core 5 should be understood as being representative, in the broader aspects of my invention, of any induction-motor induced element or secondary member, whether completely rotatable or only slightly oscillatable between open and closed contact-positions, and whether the magnetic core-member 5 is separate and stationary or attached and rotatable with the induced-current rotor-conductor 6. While my invention was primarily designed for, and is singularly effective in, a low-energy relay-element of the illustrated type, I wish it to be understood, also, that some of the features of my invention are susceptible of some utility in other forms of devices.

I claim as my invention:

1. An alternating-current product-responsive torque-producing device, comprising a stationary magnetic-field member and an induced-current rotor-member in cooperative relation to each other; two secondary pairs of diametrically opposite alternating-current secondary field-winding-means, spaced circumferentially about said field-member in a four-pole construction; a closed secondary circuit including all of said secondary field-winding-means in such polarities that one pole of each secondary pair is north at the same moment when the diametrically opposite pole of that secondary pair is south; a primary pair of diametrically opposite alternating-current energizing field-winding-means, supported by the field-member in inductive relation to the respective secondary field-winding-means of one of said secondary pairs; and a single-phase primary energizing-circuit for said primary pair of field-winding-means in such polarities that one pole of said primary pair is north at the same moment when the diametrically opposite pole of that primary pair is south.

2. A plural-energized, differentially responsive, alternating-current product-responsive torque-producing relay-device, comprising a stationary magnetic-field member and an induced-current rotor-member is cooperative relation to each other; two secondary pairs of diametrically opposite alternating-current secondary field-winding-means, spaced circumferentially about said field-member in a four-pole construction; a closed secondary circuit including all of said secondary field-winding-means in such polarities that one pole of each secondary pair is north at the same moment when the diametrically opposite pole of that secondary pair is south; at least two primary pairs of diametrically opposite alternating-current energizing field-winding-means, at least one of said primary pairs being an operating-torque means which is supported by the field-member in inductive relation to the respective secondary field-winding-means of a first one of said two secondary pairs, and at least another one of said primary pairs being a restraining-torque means which is supported by the field-member in inductive relation to the respective secondary field-winding-means of the second one of said two secondary pairs; a single-phase relay-operating energizing-circuit-means for the operating-torque primary pair; and a single-phase relay-restraining energizing-circuit means for the restraining-torque primary pair; each energizing-circuit-means being operatively connected to its primary pair in such polarities that it makes one pole of said primary pair north at the same moment when the diametrically opposite pole of that primary pair is south.

3. A plural-energized, differentially responsive, alternating-current product-responsive torque-producing relay-device, comprising a stationary magnetic-field member and an induced-current rotor-member in cooperative relation to each other; two secondary pairs of diametrically opposite alternating-current secondary field-winding-means, spaced circumferentially about said field-member in a four-pole construction; a closed secondary circuit including all of said secondary field-winding-means in such polarities that one pole of each secondary pair is north at the same moment when the diametrically opposite pole of that secondary pair is south; at least two primary pairs of diametrically opposite alternating-current energizing field-winding-means, at least one of said primary pairs being an operating-torque means which is supported by the field-member in inductive relation to the respective secondary field-winding-means of a first one of said two secondary pairs, and at least another one of said primary pairs being a restraining-torque means which is supported by the field-member in inductive relation to the respective secondary field-winding-means of the second one of said two secondary pairs; a current-energized single-phase relay-operating energizing-circuit-means which causes the operating-torque primary pair to be traversed by a fixed operating-current; and a current-energized single-phase relay-restraining energizing-circuit means which causes the restraining-torque primary pair to be traversed by a fixed restraining-current; each energizing-circuit-means being operatively connected to its primary pair in such polarities that it makes one pole of primary pair in such polarities that it makes one pole of said primary pair north at the same moment when the diametrically opposite pole of that primary pair is south.

4. A percentage differential relay having two restraint-circuit current-terminals, an operating-circuit current-terminal, and an intermediate connecting-point, said relay comprising a stationary magnetic-field member and an induced-current rotor-member in cooperative relation to each other; two secondary pairs of diametrically opposite alternating-current secondary field-winding-means, spaced circumferentially about said field-member in a four-pole construction; a closed secondary circuit including all of said secondary field-winding-means in such polarities that one pole of each secondary pair is north at the same moment when the diametrically opposite pole of that secondary pair is south; an operating-torque primary pair of diametrically opposite alternating-current energizing field-winding-means, supported by the field-member in inductive relation to the respective secondary field-winding-means of a first one of said two secondary pairs; two restraining-torque primary pairs of diametrically opposite alternating-current energizing field-winding-means, supported by the field-member in inductive relation to the respective secondary field-winding-means of the second one of said two secondary pairs; a single-phase relay-restraining circuit-connection for each restraining-torque primary pair, one of said relay-restraining circuit-connections being between a first one of said restraint-circuit current-terminals and said intermediate connecting-point, and the other relay-restraining circuit-connection being between said intermediate connecting-point and the second restraint-circuit current-terminal; and a single-phase relay-operating circuit-connection for said operating-torque primary pair, said relay-operating circuit-connection being between said intermediate connecting-point and said operating-circuit current-terminal; each of the three circuit-connections being operatively connected to its primary pair in such polarities that it makes one pole of said primary pair north at the same moment when the diametrically opposite pole of that primary pair is south.

References Cited in the file of this patent

UNITED STATES PATENTS

| 2,000,803 | Warrington | May 7, 1935 |
| 2,011,387 | Warrington | Aug. 13, 1935 |
| 2,110,673 | McCornell | Mar. 8, 1938 |
| 2,110,676 | Prince | Mar. 8, 1938 |
| 2,345,440 | Warrington | Mar. 28, 1944 |